(12) United States Patent
Takada

(10) Patent No.: US 12,061,110 B2
(45) Date of Patent: Aug. 13, 2024

(54) DISPLACEMENT AND WEIGHT ASSOCIATION APPARATUS

(71) Applicant: NEC Corporation, Tokyo (JP)

(72) Inventor: Jun Takada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 418 days.

(21) Appl. No.: 17/432,979

(22) PCT Filed: Dec. 17, 2019

(86) PCT No.: PCT/JP2019/049460
§ 371 (c)(1),
(2) Date: Aug. 23, 2021

(87) PCT Pub. No.: WO2020/174833
PCT Pub. Date: Sep. 3, 2020

(65) Prior Publication Data
US 2022/0170779 A1    Jun. 2, 2022

(30) Foreign Application Priority Data

Feb. 26, 2019  (JP) .................................. 2019-033182

(51) Int. Cl.
*G01G 19/03* (2006.01)
*G01M 5/00* (2006.01)

(52) U.S. Cl.
CPC .......... *G01G 19/03* (2013.01); *G01M 5/0033* (2013.01)

(58) Field of Classification Search
CPC .... G01G 19/021; G01G 19/03; G01M 5/0033
See application file for complete search history.

(56) References Cited

U.S. PATENT DOCUMENTS

| 2018/0149554 | A1* | 5/2018 | Kim ..................... G01G 19/035 |
| 2019/0212223 | A1  | 7/2019 | Kusaka et al. |
| 2019/0242693 | A1* | 8/2019 | Noda ..................... G06V 20/00 |
| 2020/0011762 | A1  | 1/2020 | Reitsema |
| 2021/0172828 | A1* | 6/2021 | Kinoshita .............. G01H 17/00 |
| 2022/0136888 | A1* | 5/2022 | Takada ................... G01G 19/03 |
| | | | 177/25.13 |

FOREIGN PATENT DOCUMENTS

| CN | 105067209 A | 11/2015 |
| JP | 2014-098692 A | 5/2014 |

(Continued)

OTHER PUBLICATIONS

Machine translation of JP 2014098692 (Year: 2014).*

(Continued)

*Primary Examiner* — Natalie Huls

(57) ABSTRACT

A displacement and weight association apparatus includes a setting unit, a detecting unit, a measuring unit, and an associating unit. The setting unit sets a processing target period. The detecting unit detects weights of a plurality of vehicles having passed a structure during the processing target period. The measuring unit measures a plurality of peak values of displacement of the structure during the processing target period. The associating unit associates the peak values with the weights of the vehicles based on a magnitude relation of the measured peak values and a magnitude relation of the detected weights of the vehicles.

9 Claims, 16 Drawing Sheets

(56) References Cited

FOREIGN PATENT DOCUMENTS

| | | |
|---|---|---|
| JP | 2016-084579 A | 5/2016 |
| JP | 2017-058177 A | 3/2017 |
| WO | 2017/200380 A1 | 11/2017 |
| WO | 2018/159003 | 9/2018 |

OTHER PUBLICATIONS

Machine translation of CN105067209 (Year: 2015).*
International Search Report for PCT Application No. PCT/JP2019/049460, mailed on Feb. 10, 2020.

* cited by examiner

FIG. 3

1173 VEHICLE NUMBER AND VEHICLE WEIGHT CORRESPONDENCE TABLE

| VEHICLE NUMBER | VEHICLE WEIGHT |
|---|---|
| XXX 1 | 10 TONS |
| XXX 2 | 1 TON |
| ⋮ | ⋮ |
| XXX 3 | 20 TONS |

FIG. 4

1174 LOCATION, TIME AND VEHICLE NUMBER CORRESPONDENCE TABLE

| READER LOCATION | TIME | VEHICLE NUMBER |
|---|---|---|
| 131 | t1 | XXX 2 |
| 132 | t2 | XXX 1 |
| ⋮ | ⋮ | ⋮ |
| 131 | tn | XXX 3 |

FIG. 5

1175 DISPLACEMENT AND WEIGHT ASSOCIATION RESULT

| DEFLECTION AMOUNT PEAK VALUE | VEHICLE WEIGHT |
|---|---|
| 2 mm | 20 TONS |
| 2 mm | 20 TONS |
| 1.5 mm | 15 TONS |
| ⋮ | ⋮ |
| 0.1 mm | 1 TON |

FIG. 6

1176 DIAGNOSIS RESULT DATABASE

| DIAGNOSIS SPOT ID | DIAGNOSIS DATE AND TIME | DIAGNOSIS RESULT | DISPLACEMENT AND WEIGHT ASSOCIATION RESULT |
|---|---|---|---|
| ID14011 | 20180118 | SOUND | File14011 |
| ID14012 | 20190118 | SOUND | File14012 |

FIG. 10

| PROCESSING TARGET PERIOD A |
|---|
| XXX 1 |
| XXX 7 |
| ⋮ |
| XXX 5 |

FIG. 11

| PROCESSING TARGET PERIOD A |
|---|
| 20 TONS |
| 20 TONS |
| ⋮ |
| 1 TON |

FIG. 13

| PROCESSING TARGET PERIOD A |
|---|
| 2 mm |
| 2 mm |
| ⋮ |
| 0.1 mm |

| PROCESSING TARGET PERIOD A |
|---|
| 20 TONS |
| 20 TONS |
| 20 TONS |
| 5 TONS |
| 1 TON |
| 1 TON |

| PROCESSING TARGET PERIOD A |
|---|
| 2 mm |
| 2 mm |
| 2 mm |
| 0.5 mm |
| 0.1 mm |
| 0.1 mm |

| PROCESSING TARGET PERIOD A | |
|---|---|
| 20 TONS | 2 mm |
| 20 TONS | 2 mm |
| 20 TONS | 2 mm |
| 5 TONS | 0.5 mm |
| 1 TON | 0.1 mm |
| 1 TON | 0.1 mm |

DISPLACEMENT AND WEIGHT ASSOCIATION APPARATUS

This application is a National Stage Entry of PCT/JP2019/049460 filed on Dec. 17, 2019, which claims priority from Japanese Patent Application 2019-033182 filed on Feb. 26, 2019, the contents of all of which are incorporated herein by reference, in their entirety.

TECHNICAL FIELD

The present invention relates to a displacement and weight association apparatus, a displacement and weight association method, and a program.

BACKGROUND ART

When a vehicle passes a structure such as a bridge, a load is applied to the structure and the structure is displaced. Various techniques for obtaining a correspondence between such displacement of a structure and a vehicle weight (the weight of a vehicle) have been proposed.

For example, in Patent Document 1, an image of a structure is captured by a video camera when an individual vehicle whose weight is known exists on the structure, displacement is measured from the captured image of the structure, and a correspondence between the displacement and the weight of the vehicle are obtained.

Further, in Patent Document 2, timings when a vehicle passes through both the ends of a bridge are detected by acceleration sensors, displacement of the bridge when the vehicle exists on the bridge is detected, and the weight of the vehicle is measured by Weigh-in-Motion based on the result of detection of the above.

Patent Document 1: Japanese Unexamined Patent Application Publication No. JP-A 2016-084579

Patent Document 2: Japanese Unexamined Patent Application Publication No. JP-A 2017-058177

In order to obtain a correspondence between displacement of a structure such as a bridge and a vehicle weight causing the displacement as stated above, there is a need to detect a timing when a vehicle just passes the structure. Therefore, in a situation that a timing when a vehicle passes a structure cannot be detected, it is difficult to obtain a correspondence between displacement of the structure and the weight of the vehicle.

SUMMARY

An object of the present invention is to provide a displacement and weight association apparatus that solves the abovementioned problem; a problem that there is a need to detect a timing when a vehicle just passes a structure in order to obtain a correspondence between displacement of the structure and the weight of the vehicle causing the displacement.

A displacement and weight association apparatus according to an aspect of the present invention includes: a setting unit configured to set a processing target period; a detecting unit configured to detect weights of a plurality of vehicles having passed a structure during the processing target period; a measuring unit configured to measure a plurality of peak values of displacement of the structure during the processing target period; and an associating unit configured to associate the peak values with the weights of the vehicles based on a magnitude relation of the measured peak values and a magnitude relation of the detected weights of the vehicles.

Further, a displacement and weight association method according to another aspect of the present invention includes: setting a processing target period; detecting weights of a plurality of vehicles having passed a structure during the processing target period; measuring a plurality of peak values of displacement of the structure during the processing target period; and associating the peak values with the weights of the vehicles based on a magnitude relation of the measured peak values and a magnitude relation of the detected weights of the vehicles.

Further, on a non-transitory computer-readable recording medium according to another aspect of the present invention, a program is recorded. The program includes instructions for causing a computer to execute: a process of setting a processing target period; a process of detecting weights of a plurality of vehicles having passed a structure during the processing target period; a process of measuring a plurality of peak values of displacement of the structure during the processing target period; and a process of associating the peak values with the weights of the vehicles based on a magnitude relation of the measured peak values and a magnitude relation of the detected weights of the vehicles.

With the configurations as described above, the present invention makes it possible to obtain a correspondence between displacement of a structure and the weight of a vehicle without detecting a timing when the vehicle just passes the structure.

BRIEF DESCRIPTION OF DRAWINGS

FIG. 3 is a view showing an example of a vehicle number and vehicle weight correspondence table in the diagnostic apparatus according to the first example embodiment of the present invention;

FIG. 4 is a view showing an example of a location, time and vehicle number correspondence table in the diagnostic apparatus according to the first example embodiment of the present invention;

FIG. 5 is a view showing an example of a displacement and vehicle weight association result in the diagnostic apparatus according to the first example embodiment of the present invention;

FIG. 6 is a view showing a content example of a diagnosis result database in the diagnostic apparatus according to the first example embodiment of the present invention;

FIG. 10 is a view showing an example of a list of vehicle numbers of vehicles passing a structure during a processing target period in the diagnostic apparatus according to the first example embodiment of the present invention;

FIG. 11 is a view showing an example of a list of weights of vehicles passing a structure during a processing target period in the diagnostic apparatus according to the first example embodiment of the present invention;

FIG. 13 is a view showing an example of a list of peak values of deflection amounts during a processing target period in the diagnostic apparatus according to the first example embodiment of the present invention;

EXAMPLE EMBODIMENTS

Next, example embodiments of the present invention will be described in detail with reference to the drawings.

First Example Embodiment

Figure 1:
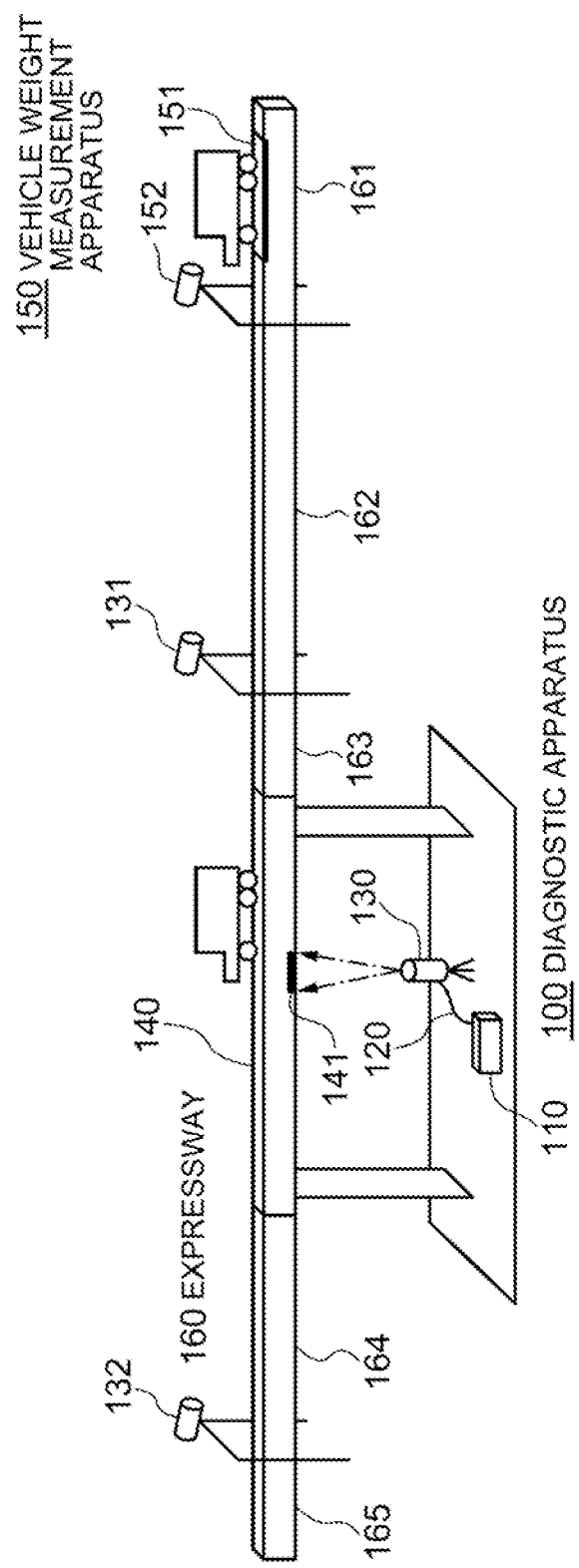
FIG. 1 is a view showing a configuration example of a diagnostic apparatus according to a first example embodiment of the present invention.

FIG. 1 is a view showing a configuration example of a diagnostic apparatus 100 according to a first example embodiment of the present invention. Referring to FIG. 1, the diagnostic apparatus 100 includes a computer 110 and a camera 130 connected to the computer 110 via a cable 120.

The camera 130 is an image capture device that captures a region 141 existing on the surface of a structure 140 to be diagnosed at a predetermined frame rate. In this example embodiment, the structure 140 is a bridge (a main lane bridge) where the main lane of an expressway 160 crosses over a river or the like. In this example embodiment, the region 141 is part of a floor deck that is a diagnosis spot of the bridge. However, the structure 140 is not limited to a bridge. The structure 140 may be an elevated structure of an expressway or a railway, or the like. The size of the region 141 is, for example, several tens of centimeters square. The camera 130 is attached to a pan head (not shown) on a tripod (not shown) so that the capture direction of the camera can be fixed in any direction. The camera 130 may be, for example, a high-speed camera that includes a CCD (Charge-Coupled Device) image sensor or a CMOS (Complementary MOS) image sensor having pixel capacity of about several million pixels. Moreover, the camera 130 may be a black and white camera, or may be an infrared camera or a color camera. Moreover, the camera 130 may include a GPS receiver that measures the position of the camera, or may include an orientation sensor and an acceleration sensor that measure the capture direction of the camera.

On an entrance lane 161 of the expressway 160, a vehicle weight measurement apparatus 150 is installed. The vehicle weight measurement apparatus 150 includes a weighing machine 151 and a vehicle number reader 152. The weighing machine 151 is a device that measures the weight of a vehicle passing the entrance lane. The weighing machine 151 is configured to measure the deflection of a steel plate or the like when a vehicle passes and perform a predetermined calculation to measure the gross weight of the vehicle. The vehicle number reader 152 is a device that recognizes, from an image obtained by capturing the license plate of a vehicle whose vehicle weight is being measured by the weighing machine 151, a character string composed of characters and numbers of the license plate, as a vehicle number. The vehicle weight measurement apparatus 150 is configured to store and output a set of the vehicle weight measured by the weighing machine 151 and the vehicle number recognized by the vehicle number reader 152 as a vehicle weight measurement result.

A vehicle having passed the entrance lane 161 travels on the expressway 160 from the right side to the left side on the sheet of paper. On the main lane of the expressway 160, a vehicle number reader 131 is installed in a region before passage of the structure 140, and a vehicle number reader 132 is installed in a region after passage of the structure 140. Each of the vehicle number readers 131 and 132 is a device that recognizes, from an image obtained by capturing the license plate of a vehicle passing through the installation location of the reader, a character string composed of characters and numbers of the license plate as a vehicle number, and stores and outputs a vehicle number reading result including the recognized vehicle number and the reading time. For convenience of explanation, a section from the entrance lane 161 to the installation location of the vehicle number reader 131 will be referred to as a main lane section 162, a section from the installation location of the vehicle number reader 131 to the entrance (right end) of the structure 140 will be referred to as a main lane section 163, a section from the exit (left end) of the structure 140 to the installation location of the vehicle number reader 132 will be referred to as a main lane section 164, and a section on the left side from the installation location of the vehicle number reader 132 will be referred to as a main lane section 165. When a vehicle having passed the entrance lane 161 enters the main lane, the vehicle travels on the expressway 160 from the right side to the left side on the sheet of paper in order of the main lane section 162, the main lane section 163, the structure 140, the main lane section 164, and the main lane section 165. The main lane sections 162 to 164 have any section lengths. For example, the main lane sections 163 and 164 may be several meters or less, or may be several kilometers or more. Moreover, in this example embodiment, for convenience of explanation, all vehicles entering the entrance lane 161 pass through the sections 162 to 164 and enter the section 165. That is to say, there is no branching point or merging point on the section 162, 163, or 164.

The computer 110 is configured to acquire a time-series image of the structure 140 captured by the camera 130 via the cable 120. Moreover, the computer 110 is configured to measure a peak value of displacement of the structure 140 based on the acquired time-series image. In this example embodiment, displacement to be measured is a deflection amount. Moreover, the computer 110 is configured to acquire a vehicle weight measurement result from the vehicle weight measurement apparatus 150 by wireless or wired communication. Moreover, the computer 110 is configured to acquire vehicle number reading results from the vehicle number readers 131 and 132 by wireless or wired communication. Moreover, the computer 110 is configured to detect a correspondence between the peak value of the deflection amount of the structure 140 and the vehicle weight based on the acquired time-series image, vehicle weight measurement result, and vehicle number reading result. Moreover, the computer 110 is configured to determine the soundness of the structure 140 based on the detected correspondence between the peak value of the deflection amount and the vehicle weight, and output the result of the determination.

Figure 2:
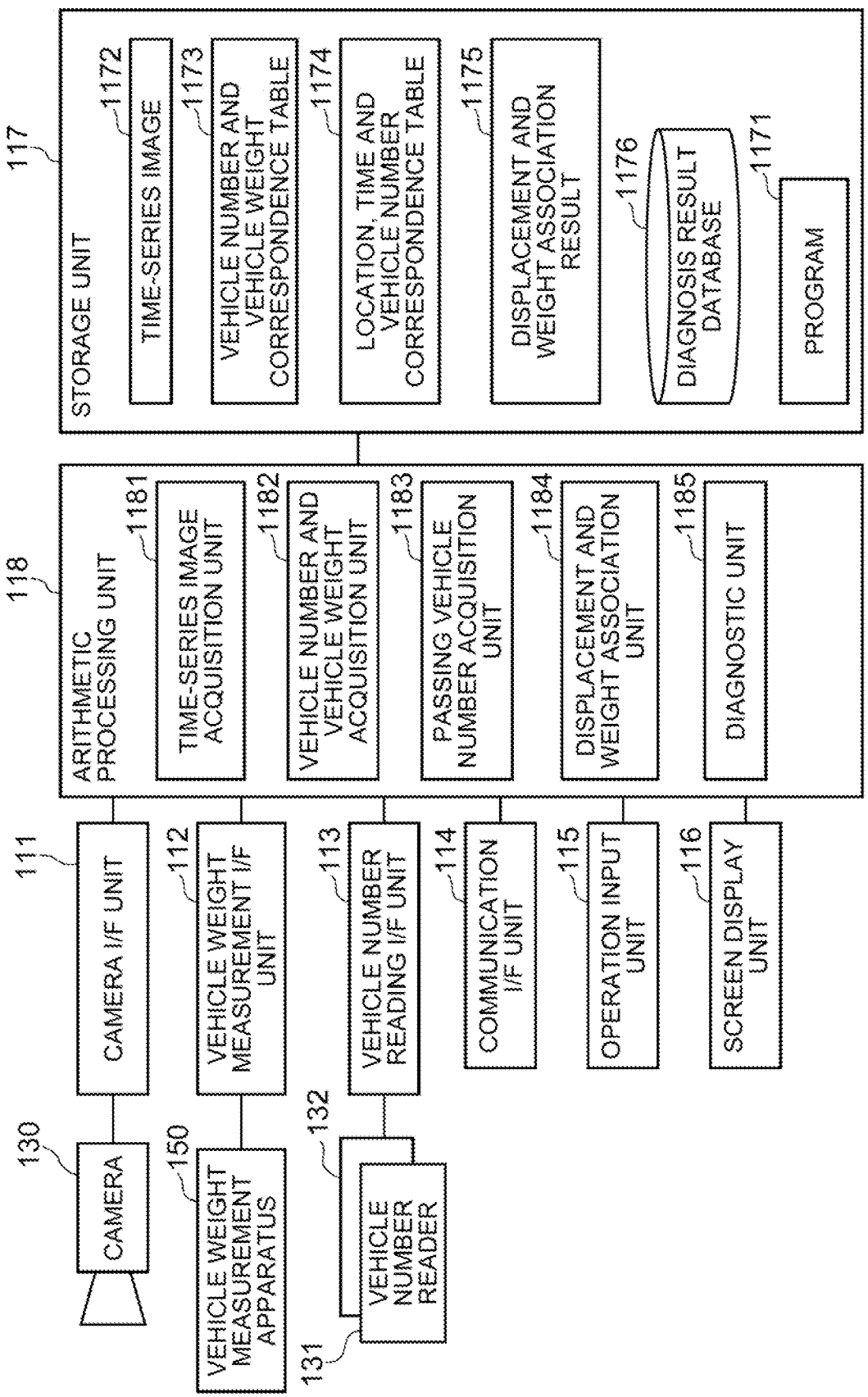
FIG. 2 is a block diagram showing an example of a configuration of a computer in the diagnostic apparatus according to the first example embodiment of the present invention.

FIG. 2 is a block diagram showing an example of a configuration of the computer 110. Referring to FIG. 2, the computer 110 includes a camera I/F (interface) unit 111, a vehicle weight measurement I/F unit 112, a vehicle number reading I/F unit 113, a communication I/F unit 114, an operation input unit 115, a screen display unit 116, a storage unit 117, and an arithmetic processing unit 118.

The camera I/F unit 111 is connected to the camera 130 through the cable 120, and is configured to perform transmission and reception of data with the camera 130 and the arithmetic processing unit 118. The vehicle weight measurement I/F unit 112 is configured to perform transmission and reception of data with the vehicle weight measurement apparatus 150 by wireless or wired communication. The vehicle number reading I/F unit 113 is configured to perform transmission and reception of data with the vehicle number readers 131 and 132 by wireless or wired communication. The communication I/F unit 114 is composed of a data communication circuit, and is configured to perform data communication with an external device (not shown) by wired or wireless communication. The operation input unit 115 is composed of an operation input device such as a keyboard and a mouse, and is configured to detect an operator's operation and output to the arithmetic processing unit 118. The screen display unit 116 is composed of a screen display device such as an LCD (Liquid Crystal Display), and is configured to display various information such as a menu screen on a screen in response to an instruction from the arithmetic processing unit 118.

The storage unit 117 is composed of a storage device such as a hard disk and a memory, and is configured to store processing information and a program 1171 that are necessary for various processes in the arithmetic processing unit 118. The program 1171 is a program that is loaded to and executed by the arithmetic processing unit 118 to realize various processing units, and is previously loaded from an external device or a recording medium, which are not shown, via a data input/output function such as the communication I/F unit 114 and stored into the storage unit 117. Major processing information stored in the storage unit 117 are a time-series image 1172, a vehicle number and vehicle weight correspondence table 1173, a location, time and vehicle number correspondence table 1174, a displacement and weight association result 1175, and a diagnosis result database 1176.

The time-series image 1172 is a time-series image captured by the camera 130. This time-series image 1172 may be a plurality of frame images composing a moving image of the region 141 of the structure 140 captured by the camera 130.

The vehicle number and vehicle weight correspondence table 1173 is a table in which the vehicle number of a vehicle is associated with the weight of the vehicle. FIG. 3 shows an example of the vehicle number and vehicle weight correspondence table 1173. The vehicle number and vehicle weight correspondence table 1173 of this example is composed of a plurality of entries, and a vehicle number and a vehicle weight are recorded in each entry. For example, an entry of the first row shows that the weight of a vehicle specified by a vehicle number XXX1 is 10 tons.

The location, time and vehicle number correspondence table 1174 is a table that shows vehicle numbers read by the vehicle number readers 131 and 132 and reading times. FIG. 4 shows an example of the location, time and vehicle number correspondence table 1174. The location, time and vehicle number correspondence table 1174 of this example is composed of a plurality of entries, and a reader location, time and a vehicle number are recorded in each entry. For example, an entry of the first row shows that the vehicle number reader 131 read a vehicle number XXX2 at time t1. In other words, this shows that a vehicle with the vehicle number XXX2 passed through the installation location of the vehicle number reader 131 at time t1.

The displacement and weight association result 1175 is data in which a deflection amount peak value of the region 141 of the structure 140 is associated with the weight of a vehicle. FIG. 5 shows an example of the displacement and weight association result 1175. The displacement and weight association result 1175 of this example is composed of a plurality of entries, and a deflection amount peak value and a vehicle weight are recorded in each entry. For example, an entry of the first row shows that a deflection amount peak value is 2 mm and a vehicle weight is 20 tons. In other words, this shows that when a load of 20 tons was applied to around the region 141 of the structure 140, a deflection of 2 mm at the maximum occurred.

The diagnosis result database 1176 is configured so that information relating to a diagnosis result is stored. FIG. 6 shows an example of data stored in the diagnosis result database 1176. The diagnosis result database 1176 of this example is composed of a plurality of entries, and a diagnosis spot ID, a diagnosis date and time, a diagnosis result, and a displacement and weight association result are recorded in each entry. For example, an entry of the first row shows that the result of diagnosis of the region 141 of the structure 140 specified by a diagnosis spot ID of ID14011 on Jan. 18, 2018 indicates soundness and the displacement and weight association result 1175 obtained in the diagnosis is stored in a file of File 14011.

The arithmetic processing unit 118 includes a processor such as an MPU and its peripheral circuit, and is configured to load the program 1171 from the storage unit 117 and execute to make the above hardware and the program 1171 cooperate and realize various processing units. Major processing units realized by the arithmetic processing unit 118 are a time-series image acquisition unit 1181, a vehicle number and vehicle weight acquisition unit 1182, a passing vehicle number acquisition unit 1183, a displacement and weight association unit 1184, and a diagnostic unit 1185.

The time-series image acquisition unit 1181 is configured to acquire a time-series image captured by the camera 130 through the camera I/F unit 111, and store the acquired time-series image added to the time-series image 1172 of the storage unit 117.

The vehicle number and vehicle weight acquisition unit 1182 is configured to acquire a vehicle weight measurement result from the vehicle weight measurement apparatus 150 through the vehicle weight measurement I/F unit 112, and store the acquired vehicle weight measurement result added to the vehicle number and vehicle weight correspondence table 1173 of the storage unit 117. For example, the vehicle number and vehicle weight acquisition unit 1182 is configured to, upon starting an operation, collectively acquire vehicle weight measurement results measured during a given period in the past from the vehicle weight measurement apparatus 150, and thereafter, acquire only a newly measured vehicle weight measurement result at all times until finishing the operation.

The passing vehicle number acquisition unit 1183 is configured to acquire vehicle number reading results from the vehicle number reader 131 and the vehicle number reader 132 through the vehicle number reading I/F unit 113, and store the acquired vehicle number reading results added to the location, time and vehicle number correspondence table 1174 of the storage unit 117. For example, the passing vehicle number acquisition unit 1183 is configured to, upon starting an operation, collectively acquire vehicle number reading results read during a given period in the past from the vehicle number readers 131 and 132, and thereafter, acquire only a newly read vehicle number reading result at all times until finishing the operation.

The displacement and weight association unit 1184 is configured to detect a deflection amount peak value of the structure 140 and its occurrence time based on the time-series image 1172 stored in the storage unit 117. Moreover, the displacement and weight association unit 1184 is configured to detect a list of the weights of vehicles passing the structure 140 during a given period based on the vehicle number and vehicle weight correspondence table 1173 and the location, time and vehicle number correspondence table 1174 stored in the storage unit 117. Moreover, the displacement and weight association unit 1184 is configured to, based on a list of the weights of vehicles passing the structure 140 during a given period and a list of deflection amount peak values of the structure 140 detected during the given period, associate the deflection amount peak values with the vehicle weights, and store the result of the association as the displacement and weight correspondence result 1175 into the storage unit 117. The details of the displacement and weight association unit 1184 will be described later.

The diagnostic unit 1185 is configured to perform a deterioration diagnosis of the structure 140 based on the displacement and weight association result 1175 stored in the storage unit 117. For example, the diagnostic unit 1185 retrieves a deflection amount peak value and a vehicle weight from an entry of the displacement and weight association result 1175, compares an allowable deflection amount previously stored in association with the retrieved vehicle weight with the retrieved peak value, and determines that there is a deterioration in the region 141 of the structure 140 when the peak value is more than the allowable deflection amount, whereas determines that the region 141 is sound when not. The diagnostic unit 1185 may execute the above determination on all of the entries of the displacement and weight association result 1175. Alternatively, the diagnostic unit 1185 may segment the weights and execute the above determination on all or some of the entries belonging to any of the segments (for example, a segment of the maximum weight). However, the method of deterioration diagnosis by the diagnostic unit 1185 is not limited to the above. The deterioration diagnosis may be performed by a method different from the above based on the displacement and weight association result 1175. Moreover, in addition to the diagnosis based on the displacement and weight association result 1175 or instead of such a diagnosis, the deterioration diagnosis may be performed by another method. For example, the diagnostic unit 1185 may analyze the time-series image 1172 stored in the storage unit 117 or a time-series image separately acquired by using the camera 130 to measure vibrations of the surface of the structure 140, and estimate an internal deterioration status such as a crack, exfoliation, and a cavity from the pattern of the vibrations. Moreover, the diagnostic unit 1185 is configured to store information relating to the estimated diagnosis result into the diagnosis result database 1176. Moreover, the diagnostic unit 1185 is configured to display the estimated diagnosis result on the screen display unit 116, and/or transmit the diagnosis result to an external terminal through the communication I/F unit 114.

Figure 7:
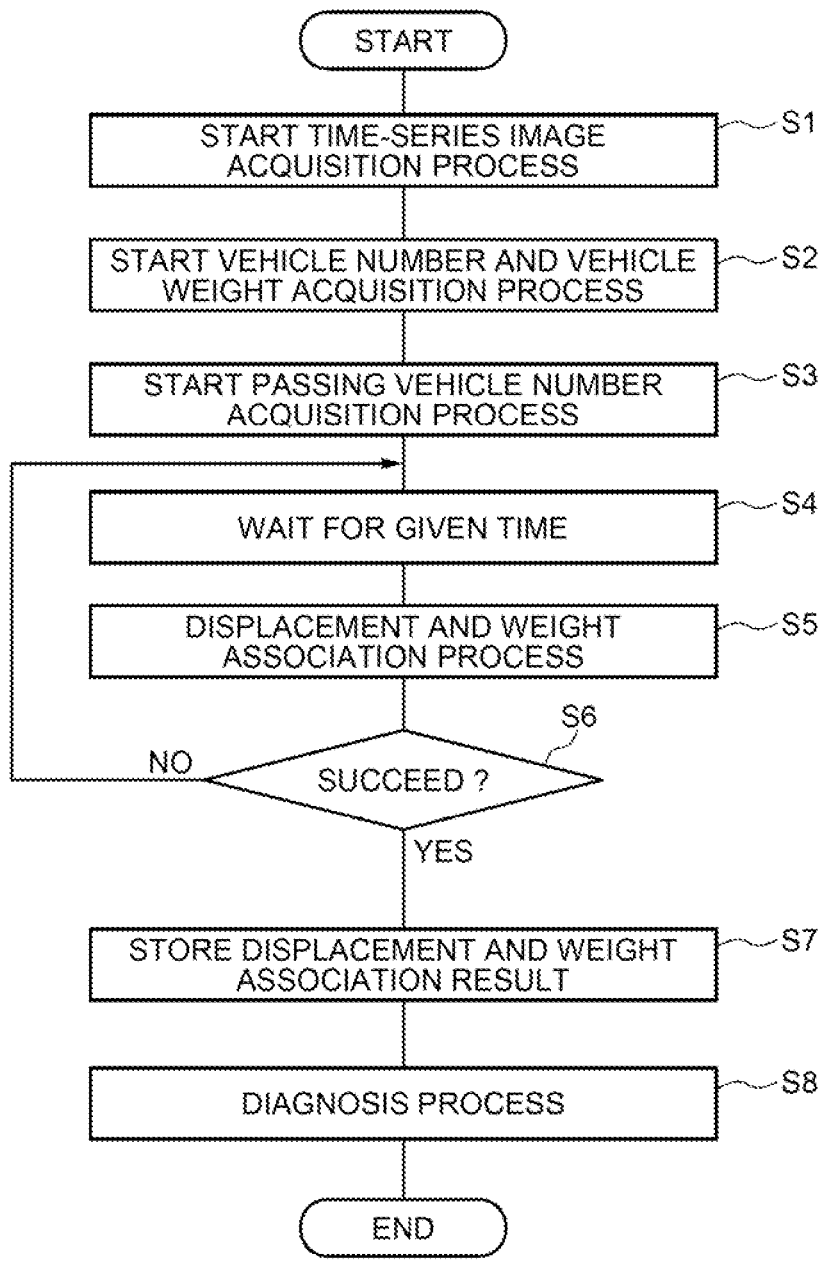
FIG. 7 is a flowchart showing an example of a process executed by the computer in the diagnostic apparatus according to the first example embodiment of the present invention.

FIG. 7 is a flowchart showing an example of an operation of the diagnostic apparatus 100. Below, with reference to the drawings, an operation of the diagnostic apparatus 100 when performing a deterioration diagnosis of the structure 140 will be described.

When an operator installs measurement devices such as the computer 110 and the camera 130 at sites and inputs an activation instruction through the operation input unit 115 in order to perform a deterioration diagnosis of the structure 140, a process shown in FIG. 7 is started by the computer 110. The vehicle weight measurement apparatus 150 and the vehicle number readers 131 and 132 are in operation at all times during the in-service period of the expressway 160.

First, the time-series image acquisition unit 1181, the vehicle number and vehicle weight acquisition unit 1182, and the passing vehicle number acquisition unit 1183 start operating. The time-series image acquisition unit 1181 acquires a time-series image of the region 141 of the structure 140 captured by the camera 130, and sequentially stores as the time-series image 1172 into the storage unit 117 (step The dis). Hereinafter, the time when the time-series image acquisition unit 1181 starts acquisition of a time-series image will be referred to as time Ts. In parallel with the operation of the time-series image acquisition unit 1181, the vehicle number and vehicle weight acquisition unit 1182 acquires a vehicle weight measurement result including the vehicle number and the vehicle weight of a vehicle passing through the entrance lane acquired by the vehicle weight measurement apparatus 150, and sequentially stores into the vehicle number and vehicle weight correspondence table 1173 of the storage unit 117 (step S2). In parallel with the operation of the time-series image acquisition unit 1181 and the operation of the vehicle number and vehicle weight acquisition unit 1182, the passing vehicle number acquisition unit 1183 acquires a vehicle number reading result including the vehicle number and the passage time of a vehicle passing through the regions before and after passage of the structure 140 from the vehicle number readers 131 and 132, and sequentially stores into the location, time and vehicle number correspondence table 1174 of the storage unit 117 (step S3). The time-series image acquisition unit 1181, the vehicle number and vehicle weight acquisition unit 1182, and the passing vehicle number acquisition unit 1183 continuously execute the above process until the process shown in FIG. 7 ends.

Next, the displacement and weight association unit 1184 waits for a given time (step S4). During the wait for the given time, the latest time-series image, the latest vehicle weight measurement result, and the latest vehicle number reading result are sequentially acquired by the time-series image acquisition unit 1181, the vehicle number and vehicle weight acquisition unit 1182, and the passing vehicle number acquisition unit 1183, and accumulated into the storage unit 117. After the wait for the given time, the displacement and weight association unit 1184 retrieves all of the accumulated time-series image 1172, vehicle number and vehicle weight correspondence table 1173, and location, time and vehicle number correspondence table 1174 from the storage unit 117, and executes a displacement and weight association process based on the retrieved images and tables (step S5). Next, when succeeding in the displacement and weight association process (step S6, YES), the displacement and weight association unit 1184 stores the displacement and association result 1175 into the storage unit 117 (step S7). On the other hand, for example, in a case where the accumulation amount of the time-series image 172 is small, or in a case where there is no traveling vehicle, the displacement and weight association unit 1184 may fail in the displacement and weight association process. In the case of failing in the displacement and weight association process (step S6, NO), the displacement and weight association unit 1184 returns to step S4 to wait for the given time again, and thereafter, retrieves all of the accumulated time-series image 1172, vehicle number and vehicle weight correspondence table 1173, and location, time and vehicle number correspondence table 1174 from the storage unit 117, and executes the displacement and weight association process based on the retrieved images and tables (step S5). Thus, the displacement and weight association unit 1184 extends the period of a time-series image to be processed until the displacement and weight association process succeeds.

When the displacement and weight association process succeeds and the displacement and weight association result 1175 is generated, the diagnostic unit 1185 retrieves the displacement and weight association result 1175 from the storage unit 117, performs a deterioration diagnosis of the structure 140 based on the displacement and weight association result 1175, and stores and outputs a diagnosis result (step S8). Then, the diagnostic unit 1185 ends the process shown in FIG. 7.

Next, a configuration example of the displacement and weight association unit 1184 will be described.

Figure 8:
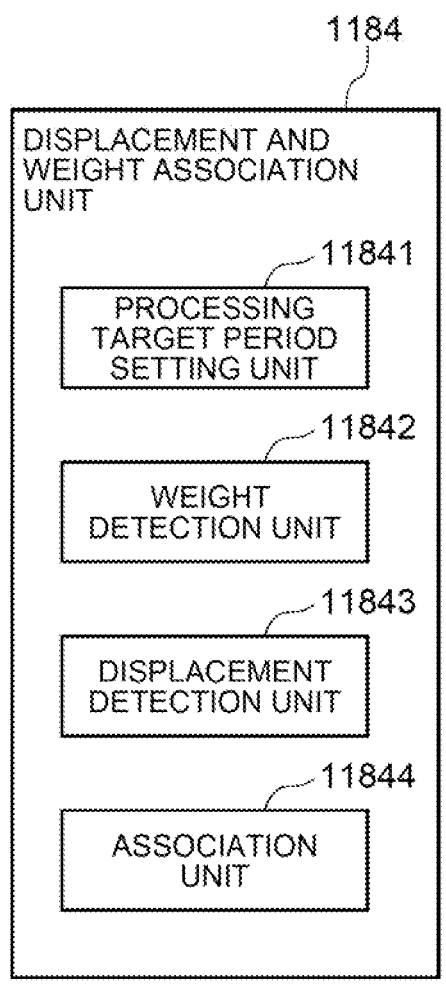
FIG. 8 is a view showing a configuration example of a displacement and weight association unit in the diagnostic apparatus according to the first example embodiment of the present invention.

FIG. 8 is a block diagram showing an example of the displacement and weight association unit 1184. Referring to FIG. 8, the displacement and weight association unit 1184 includes a processing target period setting unit 11841, a weight detection unit 11842, a displacement detection unit 11843, and an association unit 11844.

The processing target period setting unit 11841 is configured to set a processing target period to perform association. For example, the processing target period setting unit 11841 is configured to detect a plurality of time slots in which no vehicle exists in a section composed of the main lane section 163, the structure 140 and the main lane section 164 (referred to as blank time slots hereinafter), and set a period from one blank time slot to the next one blank time slot as one processing target period. To be specific, the processing target period setting unit 11841 first detects, as the blank time slots, all time slots after time Ts in which the number of vehicle numbers not read by the vehicle number reader 132 among vehicle numbers read by the vehicle number reader 131 is 0 based on the location, time and vehicle number correspondence table 1174. Next, the processing target period setting unit 11841 determines that the association has failed in a case where the number of the detected blank time slots is not two or more. In a case where the association has failed, the displacement and weight association unit 1184 executes step S4 of FIG. 7 again. In a case where the number of the detected blank time slots is two or more, the processing target period setting unit 11841 divides a period by the blank time slots and thereby sets one or more processing target periods. Moreover, the processing target period setting unit 11841 creates a list of vehicle numbers of vehicles passed the structure 140 during the set processing target period.

Figure 9:
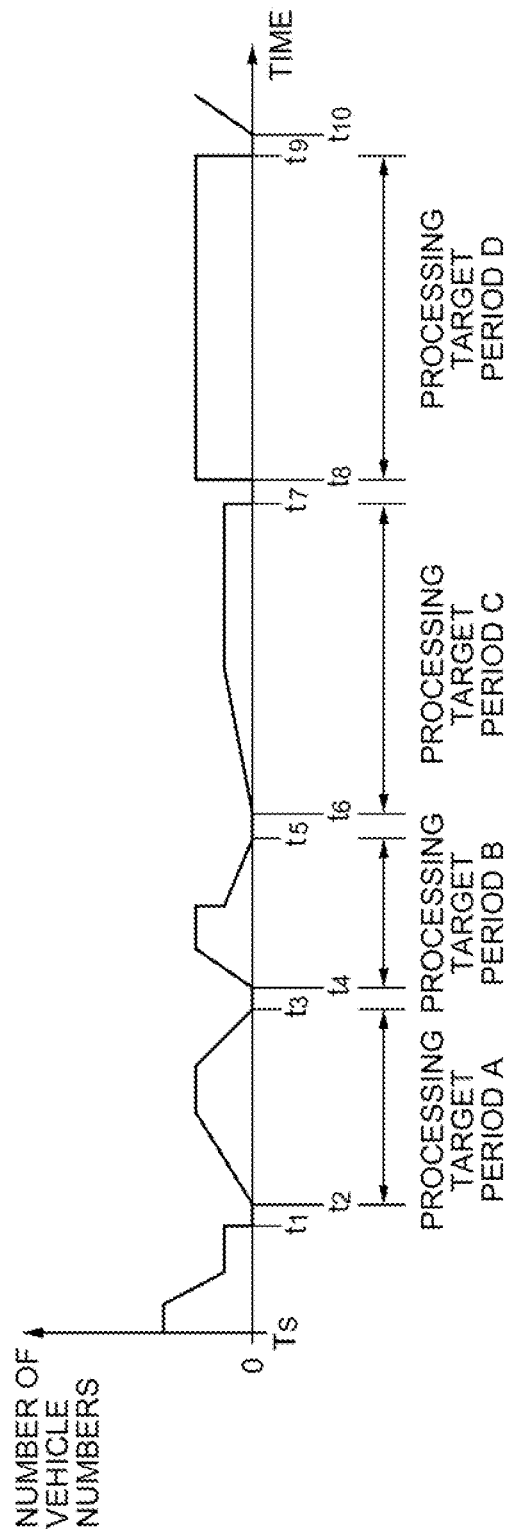
FIG. 9 is an explanatory view of an operation of a processing target period setting unit of the displacement and weight association unit in the diagnostic apparatus according to the first example embodiment of the present invention.

FIG. 9 is an explanatory view of an operation of the processing target period setting unit 11841. The horizontal axis of a graph drawn in FIG. 9 represents time, and the vertical axis represents the number of vehicle numbers not read by the vehicle number reader 132 among vehicle numbers read by the vehicle number reader 131 (referred to as the number of vehicle numbers hereinafter). In this example, after time Ts, the number of vehicle numbers becomes zero five times. Therefore, the processing target period setting unit 11841 sets a period from a blank time slot $t_1$-$t_2$ to a blank time slot $t_3$-$t_4$ as a processing target period A, sets a period from the blank time slot $t_3$-$t_4$ to a blank time slot $t_5$-$t_6$ as a processing target period B, sets a period from the blank time slot $t_5$-$t_6$ to a blank time slot $t_7$-$t_8$ as a processing target period C, and sets a period from the blank time slot $t_7$-$t_8$ to a blank time slot $t_9$- as a processing target period D.

Focusing on one processing target period, for example, the processing target period A, in the blank time slot $t_1$-$t_2$ immediately before the processing target period A, no vehicle existed in the section including the main lane section 163, the structure 140 and the main lane section 164. It seems that, at time $t_2$, a first one vehicle was read by the vehicle number reader 131 and entered the main lane section 163. After that, vehicles entering the main lane section 163 appeared one after another, passed through a section including the structure 140 and the main lane section 164, and exited to the main lane section 165. Then, at time $t_3$, no vehicle existed again in the section composed of the main lane section 163, the structure 140 and the main lane section 164, which means that all the vehicles with the vehicle numbers read by the vehicle number reader 131 after time $t_2$ passed the structure 140 and exited to the main lane section 165. Then, the processing target period setting unit 11841 creates a list of the vehicle numbers of the vehicles having passed the structure 140 during the processing target period A, from the vehicle numbers read by the vehicle number reader 131 and the vehicle number reader 132 during the period from time $t_2$ to time $t_3$. The processing target period setting unit 11841 creates lists of the vehicles numbers of passing vehicles for the other processing target periods B to D by the same process.

FIG. 10 shows an example of the list of the vehicle numbers of the vehicles having passed the structure 140 during the processing target period A. This example shows that vehicles with vehicle numbers XXX1, XXX7, . . . , XXX5 passed the structure 140.

Next, the weight detection unit 11842 receives the lists of the vehicle numbers of the passing vehicles of the respective processing target periods from the processing target period setting unit 11841, and creates a list of the weights of the vehicles having passed the structure 140 during each processing target period with reference to the vehicle number and vehicle weight correspondence table 1173 stored in the storage unit 117. For example, in a case where the list of the vehicles numbers of the vehicles having passed the structure 140 during the processing target period A includes the vehicle number XXX1 as shown in FIG. 10, the weight detection unit 11842 searches the vehicle number and vehicle weight correspondence table 1173 shown in FIG. 3 with the vehicle number XXX1 as a key, and acquires a weight 10 tons. Thus, the weight detection unit 11842 creates the list of the weights of the vehicles having passed through the structure 140 during each processing target period.

FIG. 11 shows an example of the list of the weights of the vehicles having passed the structure 140 during the processing target period A. This example shows that vehicles weighing 20 tons, 20 tons, . . . , 1 ton passed structure 140.

Next, the displacement detection unit 11843 receives information of a set processing target period from the processing target period setting unit 11841, and measures a peak value of a deflection amount of the structure 140 caused during the processing target period. To be specific, the displacement detection unit 11843 performs the following processing for each processing target period.

First, the displacement detection unit 11843 extracts a time-series image during a processing target period from the time-series image 1172 stored in the storage unit 117. Next, the displacement detection unit 11843 measures a temporal change in deflection amount of the surface of the structure 140 from each of the extracted time-series images. For example, in a case where the deck of a bridge is captured from below by a camera, a capture length L between the camera and the deck is shortened by a deflection amount δ generated on the deck of the bridge due to a vehicle weight. Therefore, the captured image is magnified about the optical axis of the camera, and apparent displacement $δ_i$ due to deflection occurs. Assuming that a capture length is L, displacement is $δ_i$, a deflection amount is δ, a length from a camera optical axis of a displacement calculation location is x, and the focal length of the camera is f, a relation of $δ_i = xf\{1/(L-δ)-1/L\}$ is established. Therefore, by detecting the displacement $δ_i$ of each frame image by a digital image correlation method or the like, the deflection amount of the surface of the structure 140 for each frame image can be calculated from the above equation. The capture length L can be measured in advance by, for example, a laser range finder, the distance x can be obtained from the displacement calculation location of the image and the camera optical axis, and f is known for each image capture device. Since minute vibrations are also picked up as deflection to be measured, it may be preferable to take general measures such as using a low-pass filter or, when the peak value is small (less than a threshold value), excluding from the count.

Figure 12:
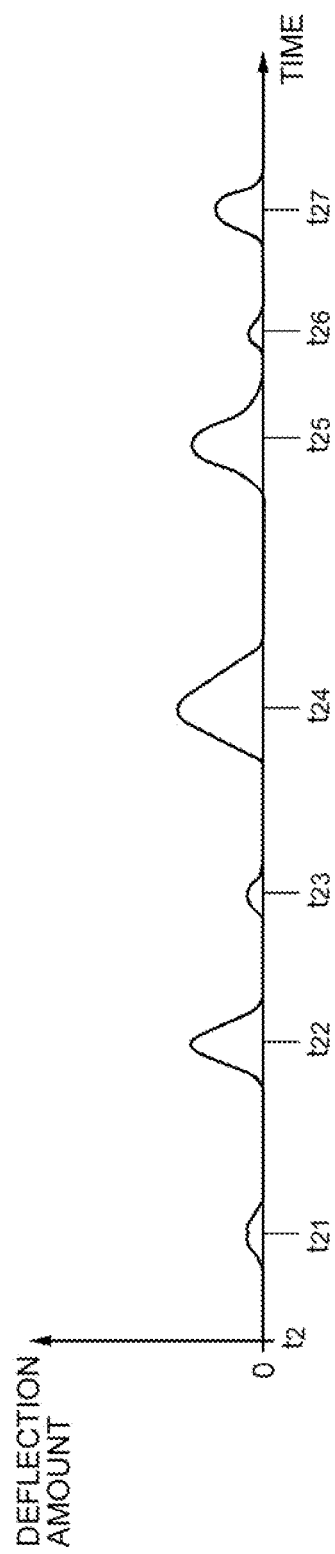
FIG. 12 is a schematic diagram showing an example of temporal change in deflection amount of a surface of a structure measured from a time-series image during a processing target period in the diagnostic apparatus according to the first example embodiment of the present invention.

FIG. 12 is a schematic view showing an example of a temporal change in deflection amount of the surface of the structure 140 measured from a time-series image during the processing target period A. The vertical axis represents a deflection amount, and the horizontal axis represents time.

Further, the displacement detection unit 11843 detects the maximal value of the measured temporal change in deflection amount to detect a deflection amount peak value. For example, in the example shown in FIG. 12, deflection amount peak values are detected at time $t_{21}$, time $t_{22}$, time $t_{23}$, time $t_{24}$, time $t_{25}$, time $t_{26}$, and time $t_{27}$. Then, the displacement detection unit 11843 creates a list of the detected deflection amount peak values for each processing target period.

Figure 13:
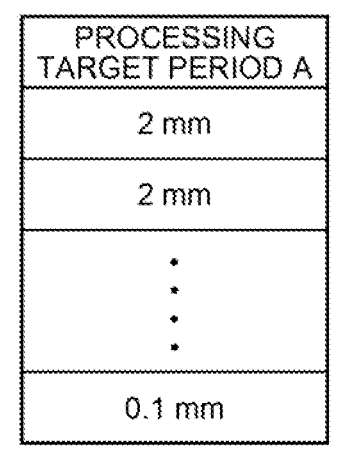

FIG. 13 shows an example of a list of deflection amount peak values during the processing target period A. This example shows that deflection amount peak values of 2 mm, 2 mm, . . . , 0.1 mm are measured.

Figure 14:
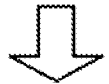
FIG. 14 is a view showing a result of sorting the list of the weights of the vehicles passing the structure during the processing target period and sorting the list of the peak values of the deflection amounts of the structure, and a result of associating the sorted lists in the diagnostic apparatus according to the first example embodiment of the present invention.

Next, the association unit 11844 receives a list of the weights of vehicles passing the structure 140 during a processing target period from the weight detection unit 11842, receives a list of the peak values of deflection amounts caused on the surface of the structure 140 during a processing target period from the displacement detection unit 11843, compares both the lists, and associates the deflection amount peak values with the vehicle weights. To be specific, the association unit 11844 sorts the list of the weights and the list of the peak values in descending order, respectively, for each processing target period, and associates the $i^{th}$ top deflection amount peak value with the $i^{th}$ top vehicle weight. For example, in a case where the sorted list of the vehicle weights and the sorted list of the deflection amount peak values are shown upward in FIG. 14 with regard to the processing target period A, the association unit 11844 generates a correspondence result as shown downward in FIG. 14.

At the time of detection of a deflection amount peak value from the time-series image 1172, mainly in the case of a lightweight vehicle, a change in deflection amount is relatively small as compared with the change in the case of a heavy-duty vehicle, and therefore, detection omission is likely to occur. Moreover, some type of the vehicle weight measurement apparatus 150 measures the weight of only a large vehicle and does not detect the weight of a car. In such an environment, there is a case where the number of elements included in the list of the vehicle weights does not coincide with the list of the deflection amount peak values, so that one or more elements of one of the lists are left without being associated with the elements of the other list. However, discarding such elements does not result in a critical issue. One reason for the above is that association of all the vehicle weights with the deflection amount peak values is not an object and association of some of the weights with the deflection amount peak values enables a deterioration diagnosis. Another reason is that because the vehicle weights and the deflection amount peak values are sorted in decreasing order and associated in order from the top, those cannot be associated are left more on the smaller value side.

Finally, the association unit 11844 merges the association results of the respective processing target periods to create the final displacement and weight association result 1175, and stores into the storage unit 117. Alternatively, the association unit 11844 executes statistical processing on the displacement and weight association result after merging to create the final displacement and weight association result 1175, and stores into the storage unit 117. Possible statistical processing is, for example, in a case where the number of the same vehicle weights (for example, 20 tons) is n and the number of deflection amount peak values corresponding thereto is n, associating the average value or the mode value of the n deflection amount peak values with the vehicle weight.

The above is an example of the displacement and weight association unit 1184.

In the above description, the processing target period setting unit 11841 of the displacement and weight association unit 1184 detects a plurality of blank time slots in which no vehicle exists in the section including the main lane section 163, the structure 140 and the main lane section 164, and sets a period from one blank time slot to the next one blank time slot as one processing target period. However, the processing target period is not limited thereto. For example, a period from any time T1 to any later time T2 may be set as a processing target period. In this case, the weight detection unit 11842 may estimate a vehicle whose vehicle number is read by the vehicle number reader 131 or the vehicle number reader 132 during a period from time T1 to time T2, as a vehicle passing the structure 140 during a processing target period, and detect the weight of the vehicle. Alternatively, the weight detection unit 11842 may, in consideration of an average time $t_1$ necessary for a vehicle to travel a distance from the installation location of the vehicle number reader 131 to the structure 140 (that is, the length of the main lane section 163), estimate a vehicle whose vehicle number is read by the vehicle number reader 131 during a period from time T1−t1 to time T2−t1, as a vehicle passing the structure 140 during a processing target period, and detect the weight of the vehicle (the vehicle number reader 132 can be omitted in this configuration). Alternatively, the weight detection unit 11842 may, in consideration of an average time t2 necessary for a vehicle to travel a distance from the structure 140 to the installation location of the vehicle number reader 132 (that is, the length of the main lane section 164), estimate a vehicle whose vehicle number is read by the vehicle number reader 132 during a period from time T1+t2 to time T2+t2, as a vehicle passing the structure 140 during a processing target period, and detect the weight of the vehicle (the vehicle number reader 131 can be omitted in this configuration). In such configurations, if there is an estimation error, the number of displacement peaks measured by the displacement detection unit 11843 during a processing target period and the number of vehicle weights detected by the weight detection unit 11842 do not match. However, by executing the statistical processing as mentioned before by the association unit 11844, it is possible to suppress an error in association between the deflection amounts and the vehicle weights even if there is an estimation error.

As described above, according to this example embodiment, a correspondence between displacement of the structure 140 and a vehicle weight can be obtained without detecting a timing when a vehicle just passes the structure 140. The reason is that the displacement and weight association unit 1184 detects the weights of a plurality of vehicles passing the structure 140 during a processing target period, measures a plurality of peak values of displacement of the structure 140 during the processing target period, and associates the peak values with the weights of the vehicles based on a magnitude relation of the measured peak values and a magnitude relation of the detected weights of the vehicles.

In this example embodiment, various additions and changes are possible. For example, in this example embodiment, a deflection amount of the structure 140 is associated with a vehicle weight. However, displacement of the structure 140 to be associated with a vehicle weight is not limited to a deflection amount. For example, in a case where the structure 140 has a crack, the width of the crack increases when a load is applied to the structure 140. Therefore, the width of a crack of the structure may be associated with a vehicle weight.

Further, in this example embodiment, displacement of the structure 140 is detected based on an image of structure 140 captured by a camera. However, the sensor detecting displacement of the structure 140 is not limited to the camera. For example, a laser range finder may be used to detect displacement such as a deflection amount of the structure 140. Moreover, for example, a strain gauge may be used to detect displacement such as a deflection amount or a crack width of the structure 140.

Second Example Embodiment

Figure 15:
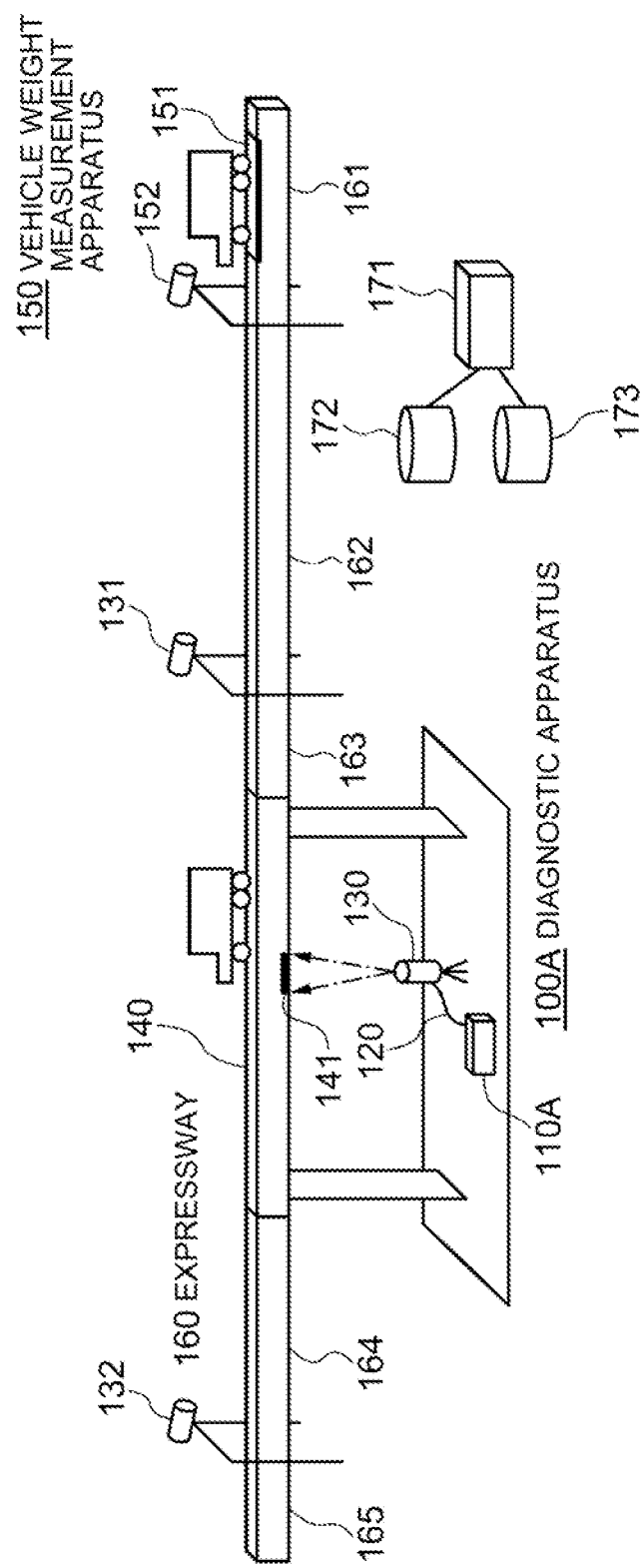
FIG. 15 is a view showing a configuration example of a diagnostic apparatus according to a second example embodiment of the present invention.

Next, a diagnostic apparatus according to a second example embodiment of the present invention will be described with reference to FIG. 15. FIG. 15 is a block diagram of a diagnostic apparatus according to this example embodiment, and the same reference numerals as in FIG. 1 denote the same parts. Reference numeral 100A denotes a diagnostic apparatus, reference numeral 110A denotes a computer, reference numeral 171 denotes a server device, reference numeral 172 denotes a vehicle number and vehicle weight correspondence table storage unit, and reference numeral 173 denotes a location, time and vehicle number correspondence table storage unit.

The server device 171 is configured to acquire a vehicle weight measurement result from the vehicle weight measurement apparatus 150 by wireless or wired communication, and add and store the acquired vehicle weight measurement result in a vehicle number and vehicle weight correspondence table of the vehicle number and vehicle weight correspondence table storage unit 172. Moreover, the server device 171 is configured to acquire a vehicle number reading result from the vehicle number reader 131 and the vehicle number reader 132 by wireless or wired communication, and add and store the acquired vehicle number reading result in a location, time and vehicle number correspondence table of the location, time and vehicle number correspondence table storage unit 173. These functions of the server device 171 are the same as the functions of the vehicle number and vehicle weight acquisition unit 118e and the passing vehicle number acquisition unit 1183.

The computer 110A is basically the same as the computer 110 shown in FIG. 2. However, the displacement and weight association unit 1184 is configured to, instead of inputting the vehicle number and vehicle weight correspondence table 1173 and the location, time and vehicle number correspondence table 1174 from the storage unit 117, input the vehicle number and vehicle weight correspondence table and the location, time and vehicle number correspondence table from the vehicle number and vehicle weight correspondence table storage unit 172 and the location, time and vehicle number correspondence table storage unit 173 through the communication I/F unit 114. Therefore, in the computer 110A, the vehicle number and vehicle weight acquisition unit 1182, the passing vehicle number acquisition unit 1183, the vehicle weight measurement I/F unit 112, and the vehicle number reading I/F unit 113 of the computer 110 are omitted.

An operation of the computer 110A is the same as the operation of the computer 110 when compared with the operation of the computer 110 except that the operations of the vehicle number and vehicle weight acquisition unit 1182 and the passing vehicle number acquisition unit 1183 are omitted, and that the displacement and weight association unit 1184 inputs the vehicle number and vehicle weight correspondence table and the location, time and vehicle number correspondence table from the vehicle number and vehicle weight correspondence table storage unit 172 and the location, time and vehicle number correspondence table storage unit 173 through the communication I/F unit 114.

According to this example, for the same reason as in the first example embodiment, it is possible to obtain a correspondence between displacement of the structure 140 and a vehicle weight without detecting a timing when a vehicle just passes the structure 140. Moreover, since the vehicle number and vehicle weight correspondence table and the location, time and vehicle number correspondence table generated and held in the server device 171 are accessed and used by the computer 110A, there is an advantage that the configuration and the operation of the computer 110A can be simple.

Third Example Embodiment

Figure 16:
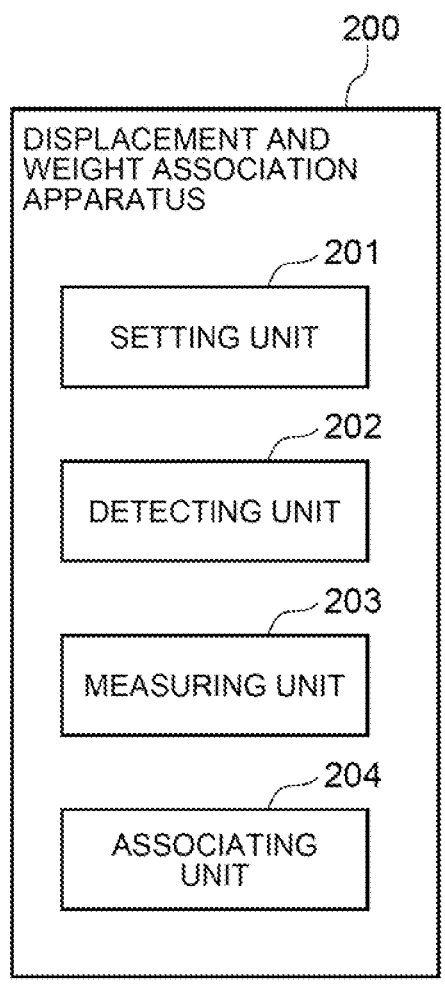
FIG. 16 is a block diagram of a displacement and weight association apparatus according to a third example embodiment of the present invention.

Next, a third example embodiment of the present invention will be described with reference to FIG. 16. FIG. 16 is a block diagram of a displacement and weight association apparatus according to this example embodiment of the present invention. In this example embodiment, the overview of the displacement and weight association apparatus of the present invention will be described.

Referring to FIG. 16, a displacement and weight association apparatus 200 according to this example embodiment includes a setting unit 201, a detecting unit 202, a measuring unit 203, and an associating unit 204.

The setting unit 201 is configured to set a processing target period. The setting unit 201 can be configured, for example, in the same manner as the processing target period setting unit 11841 shown in FIG. 8, but is not limited thereto.

The detecting unit 202 is configured to detect the weights of a plurality of vehicles passing a structure during the processing target period. The detecting unit 202 can be configured, for example, in the same manner as the weight detection unit 11842 shown in FIG. 8, but is not limited thereto.

The measuring unit 203 is configured to measure a plurality of peak values of displacement of the structure during the processing target period. The measuring unit 203 can be configured, for example, in the same manner as the displacement detection unit 11843 shown in FIG. 8, but is not limited thereto.

The associating unit 204 is configured to, based on a magnitude relation of the peak values measured by the measuring unit 203 and a magnitude relation of the weights of the vehicles detected by the detecting unit 202, associate the peak values of the displacement and the weights of the vehicles. The associating unit 204 can be configured, for example, in the same manner as the association unit 11844 shown in FIG. 8, but is not limited thereto.

The displacement and weight association apparatus 200 thus configured operates in the following manner. First, the setting unit 201 sets a processing target period. Next, the detecting unit 202 detects the weights of a plurality of vehicles passing a structure during the processing target period, and the measuring unit 203 measures a plurality of peak values of displacement of the structure during the processing target period. Next, based on a magnitude relation of the peak values measured by the measuring unit 203 and a magnitude relation of the weights of the vehicles detected by the detecting unit 202, the associating unit 204 associates the peak values of the displacement and the weights of the vehicles.

With the above configuration and operation, this example embodiment makes it possible to obtain a correspondence between displacement of a structure and a vehicle weight without detecting a timing when the vehicle just passes the structure. The reason is that based on a magnitude relation of the weights of a plurality of vehicles passing a structure during a processing target period and a magnitude relation of a plurality of peak values of displacement of the structure during the processing target period, associate the peak values of the displacement and the weights of the vehicles.

Although the present invention has been described above with reference to the example embodiments, the present invention is not limited to the above example embodiments. The configurations and details of the present invention can be changed in various manners that can be understood by one skilled in the art within the scope of the present invention.

The present invention is based upon and claims the benefit of priority from Japanese patent application No. 2019-033182, filed on Feb. 26, 2019, the disclosure of which is incorporated herein in its entirety by reference.

The present invention can be utilized, for example, in the case of associating the weight of a vehicle passing a structure such as a bridge and displacement such as the deflection amount of the structure.

The whole or part of the example embodiments disclosed above can be described as, but not limited to, the following supplementary notes.

[Supplementary Note 1]

A displacement and weight association apparatus comprising:
 a setting unit configured to set a processing target period;
 a detecting unit configured to detect weights of a plurality of vehicles having passed a structure during the processing target period;
 a measuring unit configured to measure a plurality of peak values of displacement of the structure during the processing target period; and
 an associating unit configured to associate the peak values with the weights of the vehicles based on a magnitude relation of the measured peak values and a magnitude relation of the detected weights of the vehicles.

[Supplementary Note 2]

The displacement and weight association apparatus according to Supplementary Note 1, wherein the setting unit is configured to set the processing target period with a time slot as a separator, the time slot being a time slot where the number of vehicle numbers having not been read by a second vehicle number reader among vehicle numbers having been read by a first vehicle reader becomes zero, the second vehicle number reader reading a vehicle number of a vehicle passing through a region after passage of the structure, the first vehicle number reader reading a vehicle number of a vehicle passing through a region before passage of the structure.

[Supplementary Note 3]

The displacement and weight association apparatus according to Supplementary Note 1 or 2, wherein the detecting unit is configured to:
 input a result of reading a vehicle number having been read during the processing target period by a first vehicle number reader, or a result of reading a vehicle number having been read during the processing target period by a second vehicle number reader, the first vehicle number reader reading a vehicle number of a vehicle passing through a region before passage of the structure, the second vehicle number reader reading a vehicle number of a vehicle passing through a region after passage of the structure;
 input a vehicle number and vehicle weight correspondence table showing a correspondence between a vehicle number and a weight from a weight measurement apparatus detecting a weight and a vehicle number of a vehicle which is about to pass the structure; and detect weights of a plurality of vehicles having passed the structure during the processing target period from the result of reading the vehicle number and the vehicle number and vehicle weight correspondence table.

[Supplementary Note 4]

The displacement and weight association apparatus according to any of Supplementary Notes 1 to 3, wherein the measuring unit is configured to analyze a time-series image obtained by capturing a surface of the structure to detect a temporal change in displacement of the structure, and detect a maximal value of the temporal change in displacement.

[Supplementary Note 5]

The displacement and weight association apparatus according to any of Supplementary Notes 1 to 4, wherein the associating unit is configured to sort the peak values and the weights of the vehicles in decreasing order, respectively, and associate an $i^{th}$ top peak value of the sorted peak values with an $i^{th}$ top weight of the sorted weights of the vehicles.

[Supplementary Note 6]

The displacement and weight association apparatus according to any of Supplementary Notes 1 to 5, further comprising a diagnosing unit configured to perform a deterioration diagnosis of the structure based on a result of associating the peak values with the weights of the vehicles.

[Supplementary Note 7]

A displacement and weight association method comprising:

setting a processing target period;

detecting weights of a plurality of vehicles having passed a structure during the processing target period;

measuring a plurality of peak values of displacement of the structure during the processing target period; and associating the peak values with the weights of the vehicles based on a magnitude relation of the measured peak values and a magnitude relation of the detected weights of the vehicles.

[Supplementary Note 8]

A non-transitory computer-readable recording medium on which a program is recorded, the program comprising instructions for causing a computer to execute:

a process of setting a processing target period;

a process of detecting weights of a plurality of vehicles having passed a structure during the processing target period;

a process of measuring a plurality of peak values of displacement of the structure during the processing target period; and a process of associating the peak values with the weights of the vehicles based on a magnitude relation of the measured peak values and a magnitude relation of the detected weights of the vehicles.

DESCRIPTION OF NUMERALS 100 diagnostic apparatus
110 computer
111 camera I/F unit
112 vehicle weight measurement I/F unit
113 vehicle number reading I/F unit
114 communication I/F unit
115 operation input unit
116 screen display unit
117 storage unit
118 arithmetic processing unit
120 cable
130 camera
131 vehicle number reader
132 vehicle number reader
140 structure
141 region
150 vehicle weight measurement apparatus
151 weighing machine
152 vehicle number reader
160 expressway
161 entrance lane
162 main lane section
163 main lane section
164 main lane section
165 main lane section
171 server device
172 vehicle number and vehicle weight correspondence table storage unit
173 location, time and vehicle number correspondence table storage unit
200 displacement and weight association apparatus
201 setting unit
202 detecting unit
203 measuring unit
204 associating unit

What is claimed is:

1. A displacement and weight association apparatus comprising:

a memory containing program instructions; and a processor coupled to the memory, wherein the processor is configured to execute the program instructions to:

set a processing target period for a target bridge to be diagnosed;

detect weights of a plurality of vehicles traveling over the target bridge during the processing target period;

measure a plurality of peak values of displacement generated on a measurement spot set on a floor deck of the target bridge during the processing target period, wherein the peak values of the displacement are measured by analyzing time-series images of the measurement spot captured by a camera substantially immediately below the measurement spot;

order the weights of the vehicles from highest to lowest;

order the peak value of the displacement from highest to lowest;

respectively associate the peak values of the displacement as ordered with the weights of the vehicles as order, such that a highest peak displacement value is associated with a highest vehicle weight and a lowest peak displacement value is associated with a lowest vehicle weight; and perform deterioration diagnosis of the target bridge based on the peak values of the displacement respectively associated with the weights of the vehicle, and output a result of the deterioration diagnosis.

2. The displacement and weight association apparatus according to claim 1, wherein the processing target period is set with a time slot as a separator, the time slot being a time slot in which all vehicle numbers of that were previously read by a first reader before the vehicles traveled on the target bridge have been read by a second reader as the vehicles are traveling on the target bridge.

3. The displacement and weight association apparatus according to claim 1, wherein the processor is configured to execute the program instructions to further:

receive vehicle numbers of the vehicles as read during the processing target period by a first read before the vehicles traveled on the target bridge or by a second reader as the vehicles are traveling on the target bridge, wherein the weights of the vehicles are detected by looking up vehicle numbers in a vehicle number-to-weight correspondence table storing the weights of the vehicles in association with the vehicle numbers of the vehicles.

4. The displacement and weight association apparatus according to claim 1, wherein the processor is configured to execute the program instructions to further:

obtain the time-series images as captured by the camera.

5. A displacement and weight association method performed by a computer and comprising:

setting a processing target period for a target bridge to be diagnosed;

detecting weights of a plurality of vehicle traveling over the target bridge during the processing target period;

measuring a plurality of peak values of displacement generated on a measurement spot set on a floor deck of the target bridge during the processing target period, wherein the peak values of the displacement are measured by analyzing time-series images of the measurement spot captured by a camera substantially immediately below the measurement spot;

ordering the weights of the vehicles from highest to lowest;

ordering the peak value of the displacement from highest to lowest;

respectively associating the peak values of the displacement as ordered with the weights of the vehicles as order, such that a highest peak displacement value is associated with a highest vehicle weight and a lowest peak displacement value is associated with a lowest vehicle weight; and performing deterioration diagnosis of the target bridge based on the peak values of the displacement respectively associated with the weights of the vehicle, and output a result of the deterioration diagnosis.

6. The displacement and weight association method according to claim 5, wherein the processing target period is set with a time slot as a separator, the time slot being a time slot in which all vehicle numbers of that were previously read by a first reader before the vehicles traveled on the target bridge have been read by a second reader as the vehicles are traveling on the target bridge.

7. The displacement and weight association method according to claim 5, further comprising:

receiving vehicle numbers of the vehicles as read during the processing target period by a first read before the vehicles traveled on the target bridge or by a second reader as the vehicles are traveling on the target bridge, wherein the weights of the vehicles are detected by looking up vehicle numbers in a vehicle number-to-weight correspondence table storing the weights of the vehicles in association with the vehicle numbers of the vehicles.

8. The displacement and weight association method according to claim 5, further comprising:

obtaining the time-series images as captured by the camera.

9. A non-transitory computer-readable recording medium storing a program for causing a computer to execute:

setting a processing target period for a target bridge to be diagnosed;

detecting weights of a plurality of vehicle traveling over the target bridge during the processing target period;

measuring a plurality of peak values of displacement generated on a measurement spot set on a floor deck of the target bridge during the processing target period, wherein the peak values of the displacement are measured by analyzing time-series images of the measurement spot captured by a camera substantially immediately below the measurement spot;

ordering the weights of the vehicles from highest to lowest;

ordering the peak value of the displacement from highest to lowest;

respectively associating the peak values of the displacement as ordered with the weights of the vehicles as order, such that a highest peak displacement value is associated with a highest vehicle weight and a lowest peak displacement value is associated with a lowest vehicle weight; and performing deterioration diagnosis of the target bridge based on the peak values of the displacement respectively associated with the weights of the vehicle, and output a result of the deterioration diagnosis.

* * * * *